Patented Oct. 7, 1941

2,258,019

UNITED STATES PATENT OFFICE 2,258,019

FILLER CAP VENT VALVE

Harold Kramer, Ladue, and Arthur N. Milster, Ferguson, Mo., assignors to Wagner Electric Corporation, St. Louis, Mo., a corporation of Delaware Application December 28, 1939, Serial No. 311,324

8 Claims. (Cl. 188—152)

Our invention relates to valves and more particularly to a valve for the vent of a filler cap.

One of the objects of our invention is to provide improved valve means for controlling the vent for a liquid container on a moving vehicle so as to prevent the liquid from being lost through the vent movement of the liquid under the action of inertia during acceleration and deceleration of the vehicle.

Another and more specific object of our invention is to embody in a filler cap of a container an improved inertia and gravity controlled valve means for the vent therein which will prevent liquid from being lost out of the container.

Figure 1:
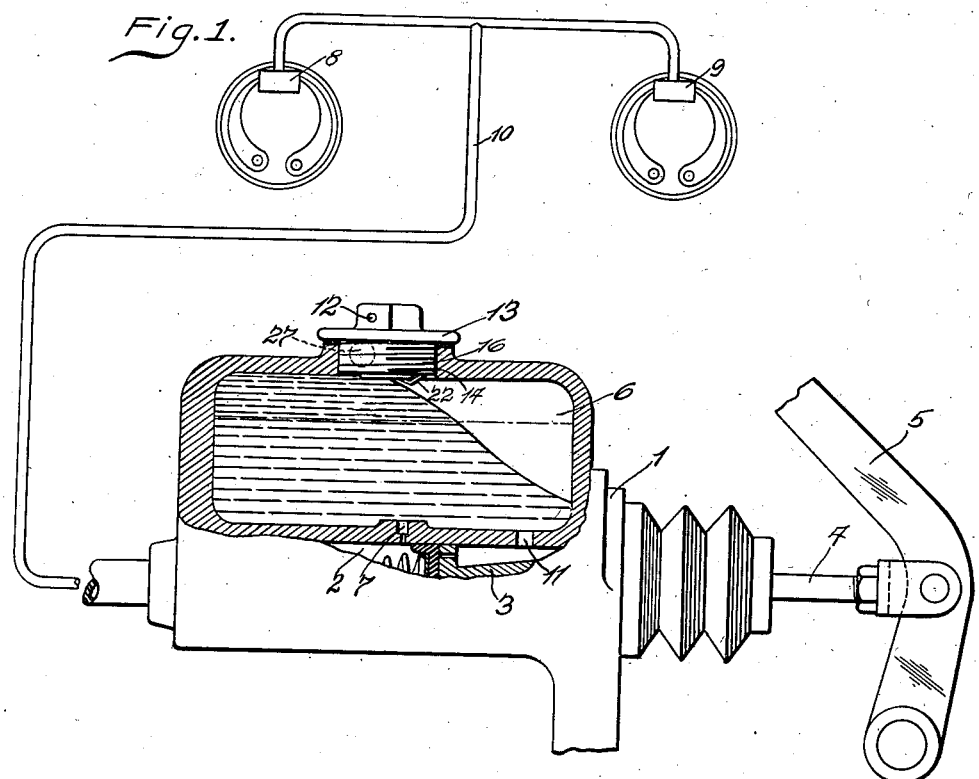
Figure 2:
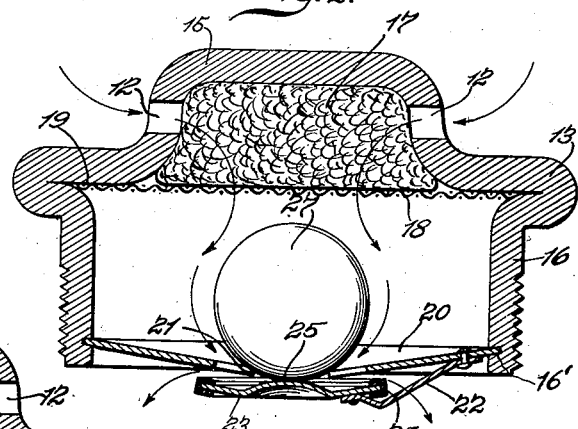
Figure 3:
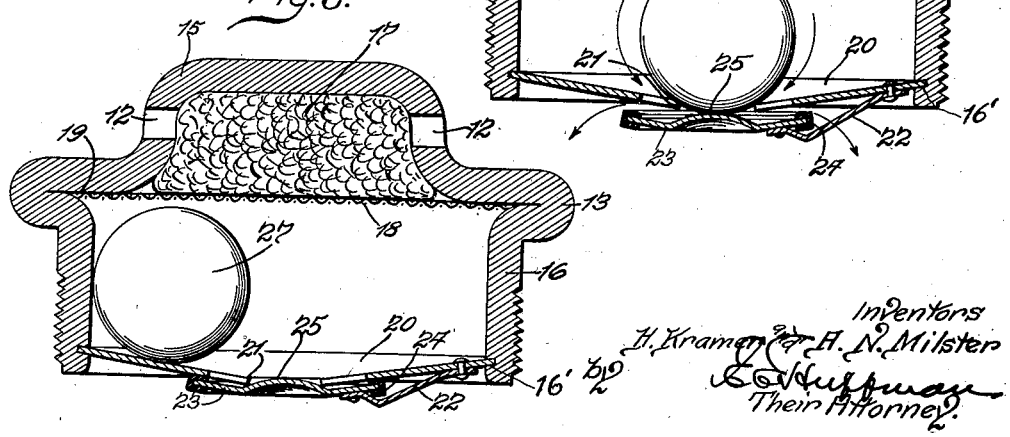

Other objects of our invention will become apparent from the following description taken in connection with the accompanying drawing in which Figure 1 is view of a hydraulic braking system having a master cylinder provided with a filler cap for the reservoir thereof and in which is embodied our improved valve means for controlling the vent; Figure 2 is a cross-sectional view of the cap and valve showing the valve open and Figure 3 is a cross-sectional view showing the valve closed.

Although our invention may be associated with any vent for a fluid container, we have shown it embodied in the filler cap for a reservoir on a master cylinder of a hydraulic braking system. As shown in Figure 1 this system is of known construction and comprises a master cylinder 1, having a cylinder 2 in which is reciprocable a piston 3 actuated by a piston rod 4 and a pedal 5. The cylinder has associated therewith a liquid containing reservoir 6 communicating with the cylinder by a port hole 7 which is uncovered by the piston and its packing cup when said piston is in its retracted or inoperative position. This construction permits contraction and expansion of the liquid due to temperature changes and the reservoir insures that the braking system will always be filled with liquid. The cylinder communicates with the brake actuating fluid motors 8 and 9 by conduits 10. When the piston 3 is moved forwardly the port will be cut off and pressure developed to actuate the brakes by the fluid motors. When the piston is retracted liquid from the reservoir, which is behind the piston due to the opening 11, insures that sub-atmospheric pressure will not develop in the system since liquid can flow past the piston head and packing cup in a well known manner. Any excess liquid in the system when the port hole is uncovered passes back into the reservoir.

In such a fluid pressure system the reservoir is provided with a vent in order to permit air to be drawn into or expelled from the reservoir as the volume of liquid in the reservoir changes. The vent shown at 12 is usually embodied in the filler cap 13 for the filler opening 14 of the reservoir. Because of this vent liquid from the reservoir may be lost therethrough by the liquid "piling up" in the reservoir under the action of inertia during deceleration or acceleration of the vehicle upon which the master cylinder is mounted.

In accordance with our invention we provide valve means for the reservoir vent which will prevent this loss of liquid. As shown in Figures 2 and 3 the filler cap comprises an upper dome portion 15 of square shape for receiving a wrench and a body portion in the form of a cylindrical extension 16 provided with external threads. In order that dirt and foreign material may not enter the vent 12 the dome portion there is provided with filter material 17 which is held in the dome by a screen 18 cooperating with the groove 19 formed in the cap during its manufacture.

In the bottom of the cap there is provided a concave platform 20, the surface of which slopes downward uniformly from all points of the periphery to the center at which point there is provided an irregular opening 21. The platform is held at its periphery in an inner groove 16' at the outer end of the cylindrical extension 16. A leaf spring 22 is secured at one end to the bottom surface of the platform and carried on its other end is a disc valve member 23 having a rubber sealing member 24 attached to its periphery. The disc is normally held against the bottom surface of the platform by the spring so as to close the opening 21. The central part of the disc valve member is provided with a raised portion 25 which projects into the opening 21 when the disc valve member is in closed position. A ball 27 of appreciable weight is positioned in the chamber of the cap above the platform and rests thereon. The opening 21 in the platform is such size that when the ball is acted on by gravity and positioned in the center of the platform it will rest in the opening 21 and because of its weight hold the disc valve member away from the opening.

In operation when the vehicle is not moving or moving at a substantially uniform rate of speed the ball 27 will be acted upon by gravity only and because of the concave surface of the platform it will position itself as shown in Figure 2 thus causing the disc valve member to be open. Air is thus free to pass in and out of the reservoir as indicated by the arrows since the irregular edge of the opening 21 prevents the ball from entirely closing this opening. The liquid in the reservoir will not have such position or be so disturbed under these conditions as to pass out of the reservoir through the open valve and vent and thus be wasted.

If the vehicle should be accelerating or decelerating the action of inertia will be effective on the liquid and tend to cause it to "pile up" in one end of the reservoir (illustrated in Figure 1) and thus be forced out through the vent in the filler cap. Our improved valve means however, will prevent any loss of fluid during these conditions since the action of inertia will also be effective on the ball and thus cause it to roll out of the opening 21 and up the surface of the platform, as indicated in Figure 3. The slope of the surface of the platform is such that the ball can roll up it whenever the rate of deceleration or acceleration causes the liquid in the reservoir to so "pile up" as to approach the bottom of the filler cap. With the ball in this position the spring 22 will cause the disc valve member to close the opening 21. Thus no fluid can pass through the opening and be dissipated. If because of actuation of the master cylinder or for any other reason there is a change in pressure of the air in the reservoir this air will again be at atmospheric pressure when the ball assumes the central position and opens the disc valve member as a result of the action of gravity when the vehicle is stopped or is moving at a substantial uniform speed. The ball will also assume a position permitting the valve to be closed in the event the vehicle should assume a position on a grade permitting the fluid to assume a position in the reservoir where it could flow out of the vent in the cap if the valve were not closed.

It is to be noted that the valve construction is such as to be readily incorporated in the ordinary size filler cap. Also, the construction is such that the operation of the valve is always the same for any rotative position of the filler cap. It also operates either during deceleration or acceleration of the vehicle upon which the master cylinder and reservoir are positioned. The filler cap construction and the arrangement of the valve therein also permits the embodying of filter material and screen in the cap in a very compact manner.

Being aware of the possibility of modifications in the particular structure described without departing from the fundamental principles of our invention, we do not intend that its scope be limited except as set forth in the appended claims.

Having fully described our invention, what we claim as new and desire to secure by Letters Patent of the United States is:

1. In combination with a liquid containing reservoir of a master cylinder device employed with an hydraulic braking system, said reservoir being provided with a filler opening and mounted on a vehicle whereby the liquid therein is subject to movement by the action of inertia during deceleration of the vehicle, of a filler cap for the opening and provided with a vent, and inertia controlled valve means associated with the vent for preventing liquid in the reservoir from being forced out the vent when the vehicle is decelerating, said valve means being open when the vehicle is stopped or moving at a constant speed.

2. In combination with a liquid containing reservoir of a master cylinder device employed with an hydraulic braking system, said reservoir being provided with a filler opening and mounted on a vehicle whereby the liquid therein is subject to movement by the action of inertia during deceleration of the vehicle, of a filler cap for the opening and provided with a vent, a valve associated with the vent, yieldable means for biasing the valve closed, and a member subject to the action of gravity and the action of inertia for controlling the valve, said member assuming a position under the action of gravity when the vehicle is either stopped or moving at a constant speed for causing the valve to be open and another position under the action of inertia during deceleration of the vehicle for causing the valve to be closed.

3. In combination with a liquid containing reservoir of a master cylinder device employed with an hydraulic braking system, said reservoir being provided with a filler opening and mounted on a vehicle whereby the liquid therein is subject to movement by the action of inertia during deceleration of the vehicle, of a filler cap for the opening and provided with a vent, valve means associated with the vent and comprising a movable valve member, yieldable means for biasing the valve member closed, and a rolling ball so mounted as to be subject to the action of gravity and the action of inertia for controlling the valve, said ball assuming a position under the action of gravity when the vehicle is either stopped or moving at a constant speed for holding the valve member open and another position under the action of inertia during deceleration of the vehicle for permitting the valve to be closed by the yieldable means.

4. In combination with a liquid containing reservoir of a master cylinder device employed with an hydraulic braking system, said reservoir being provided with a filler opening and mounted on a vehicle whereby the liquid therein is subject to movement by the action of inertia during deceleration of the vehicle, a filler cap for the opening and provided with a chamber having a vent to atmosphere, means providing a bottom for said chamber having an inclined surface and an opening at the lower end of the surface, a biased valve member cooperating with the opening and provided with a port extending into the opening when the valve member is in closed position, and a ball in the chamber and resting on the bottom, said ball being acted on by gravity and assuming a position at the lower end of the inclined surface where it can engage said part of the valve member extending into the opening and hold said valve member open and being acted on by the action of inertia when the vehicle is decelerating and assuming a position on the inclined surface permitting the valve member to be closed.

5. In combination with a liquid container fixed in position on a vehicle whereby the liquid therein is subject to movement by the action of inertia during changes in speed of the vehicle, said container being provided with an air vent, of valve means for controlling said vent to prevent liquid from being forced out of the container through the vent when the liquid moves about in the container, said valve means comprising a combined inertia and gravity controlled member which is so mounted that it will assume a position under the action of gravity for causing the valve means to be open when the vehicle is stopped and another position under the action of inertia for causing the valve means to be closed when the speed of the vehicle varies on a substantially horizontal roadway.

6. In combination with a liquid container fixed in position on a vehicle whereby the liquid therein is subject to movement by the action of inertia during changes in speed of the vehicle, said container being provided with an air vent, of valve means for controlling said vent to prevent liquid from being forced out of the container through the vent when the liquid moves about in the container, said valve means comprising a movable valve member biased to a closed position and a rolling ball so mounted as to be capable of assuming a position holding the valve member open when the vehicle is stopped and assuming a position under the action of inertia permitting the valve member to be closed when the speed of the vehicle changes on a substantially horizontal roadway.

7. In apparatus of the class described, a hollow filler cap provided with a vent and having an annular threaded flange, a separate concave platform of substantial area secured to the outer end of the flange and having an opening in its central part, a disc valve member associated with the lower side of the opening and having a raised portion adapted to enter the opening when the valve member closes the opening, a leaf spring secured to the platform and the disc for biasing the disc into engagement with the platform and closing the opening, and a ball mounted on the platform for controlling the opening and closing of the disc valve member, said disc being held open by the weight of the ball when it is over the opening and contacts the raised part and said disc being held closed by the spring when the ball is caused to roll onto the concave surface of the platform and away from the opening.

8. An apparatus of the class described, a hollow filler cap having a dome portion provided with an irregular wrench receiving external surface and with an integral annular flange, said dome being provided with a vent, filter material in the dome, a screen at the juncture of the dome and flange for holding the filter material in the dome, a separate closure member in the form of a concave disc secured to the outer end of the flange and provided with a central opening, valve means for said opening comprising a spring-biased disc cooperating with the bottom of the platform and having a raised portion protruding through the opening in the concave disc when the valve means is closed, and inertia and gravity controlled means for governing the opening and closing of the valve means and comprising a ball positioned in the cap between the screen and the concave disc, said ball when at the bottom of the concave surface engaging the raised portion to hold the valve means open.

HAROLD KRAMER.
ARTHUR N. MILSTER.